(12) United States Patent
Brazeau et al.

(10) Patent No.: US 12,328,077 B2
(45) Date of Patent: Jun. 10, 2025

(54) INVERTER WITH HOUSING CHAMBERS FOR ELECTROMAGNETIC INTERFERENCE (EMI) REDUCTION

(71) Applicant: DANA TM4 INC., Boucherville (CA)

(72) Inventors: Michel Brazeau, Delson (CA);
Maalainine El Yacoubi, Sainte Julie (CA); Francois Dube, Montreal (CA);
Maxime Caron, Montreal (CA)

(73) Assignee: DANA TM4 INC., Boucherville (CA)

( * ) Notice: Subject to any disclaimer, the term of this patent is extended or adjusted under 35 U.S.C. 154(b) by 463 days.

(21) Appl. No.: 17/934,150

(22) Filed: Sep. 21, 2022

(65) Prior Publication Data
US 2024/0097577 A1    Mar. 21, 2024

(51) Int. Cl.
| | |
|---|---|
| *H02M 7/00* | (2006.01) |
| *B60L 50/60* | (2019.01) |
| *H02M 1/00* | (2007.01) |
| *H02M 1/08* | (2006.01) |
| *H02M 1/44* | (2007.01) |

(52) U.S. Cl.
CPC ......... *H02M 7/003* (2013.01); *H02M 1/0009* (2021.05); *H02M 1/08* (2013.01); *H02M 1/44* (2013.01); *B60L 50/60* (2019.02); *H02J 2207/20* (2020.01)

(58) Field of Classification Search
CPC ............................ H02M 1/44; H02M 7/003
See application file for complete search history.

(56) References Cited

U.S. PATENT DOCUMENTS

| | | |
|---|---|---|
| 2017/0063203 A1 | 3/2017 | Doo |
| 2018/0358903 A1* | 12/2018 | Takahashi ............ H02M 7/003 |
| 2021/0013782 A1* | 1/2021 | Kobayashi ............ F04B 39/121 |
| 2021/0274690 A1 | 9/2021 | Cho et al. |
| 2024/0015916 A1* | 1/2024 | Brazeau ............ H05K 7/20927 |
| 2024/0154539 A1* | 5/2024 | Brazeau ............... H02M 1/126 |
| 2024/0260240 A1* | 8/2024 | Amar ................. H05K 7/20272 |

FOREIGN PATENT DOCUMENTS

WO    2010127654 A2    11/2010

* cited by examiner

*Primary Examiner* — Nathan Milakovich
(74) *Attorney, Agent, or Firm* — McCoy Russell LLP

(57) ABSTRACT

An inverter is provided that includes a direct current (DC) bus bar assembly positioned within a DC chamber in the housing is provided herein. The inverter further includes a gate-driver circuit board included in a phase-control chamber in the housing, and an external communication interface in electronic communication with a power control circuit board and positioned in an external communication chamber in the housing. The DC chamber, the phase-control chamber, and the external communication chamber have varying levels of electromagnetic interference (EMI).

20 Claims, 6 Drawing Sheets

INVERTER WITH HOUSING CHAMBERS FOR ELECTROMAGNETIC INTERFERENCE (EMI) REDUCTION

TECHNICAL FIELD

The present disclosure relates to an inverter designed with a housing partitioned into chambers that have varying levels of electromagnetic interference (EMI).

BACKGROUND AND SUMMARY

Inverters are used in a variety of fields to change direct current (DC) to alternate current (AC). Inverters are used in a variety of fields such as electric vehicles, solar power installations, industrial equipment, etc. Inverters use power modules that switch at high frequency to enable the DC to AC conversion functionality.

US 2017/0063203 A1 to Doo et al. discloses a power inverter assembly with power modules coupled to DC capacitors and an AC bus bar. Doo's inverter assembly generally includes an outer housing that is designed to reduce electromagnetic interference (EMI) in the inverter caused by surrounding vehicle components, such as the electric motor.

The inventors have recognized several drawbacks with Doo's inverter as well as other prior inverters. For instance, the power modules in Doo's inverter may cause undesirable EMI with the DC bus sub-assembly as well as the gate drive circuit board. Consequently, the inverter's operation is degraded. Further, previous inverters have exhibited packaging inefficiencies. These space inefficiencies impose undesirable spatial constraints on surrounding components, thereby reducing the inverter's applicability.

The inventors have recognized the aforementioned challenges and developed an inverter to at least partially overcome the challenges. The inverter includes, in one example, a DC bus bar assembly electrically coupled to a capacitor and positioned within a DC chamber in the housing. The inverter further includes a gate-driver circuit board included in a phase-control chamber in the housing. The inverter further includes an external communication interface in electronic communication with a power control circuit board and positioned in an external communication chamber in the housing. In such an example, the DC chamber, the phase-control chamber, and the external communication chamber have varying levels of EMI. In this way, the impact of EMI emissions inside the inverter is reduced, and a reduction in the filtering challenge for interfaces with the outside world.

In one example, a magnitude of EMI in the DC chamber is less than a magnitude of EMI in the phase-control chamber, and a magnitude of EMI in the external communication chamber is less than the EMI in the DC chamber. In this way, different zones are created within the inverter housing with different levels of EMI that suit the levels of EMI that components contained within the zones can tolerate. Consequently, the chance of undesirable inverter operation caused by EMI is reduced. Further, the inverter's size can be reduced due to decreased EMI, if wanted, when compared to inverters which position all of the internal circuitry in a single housing enclosure.

Further in one example, an electrical interface positioned in the external communication chamber and electrically coupled to the power control circuit board via a flexible circuit board. In this way, the flexible circuit board reduces the number of cables in the inverter, thereby decreasing the amount of EMI.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An inverter is described herein that strategically reduces electromagnetic interference (EMI) by varying levels in different chambers within the inverter, to increase inverter performance and efficiency. To elaborate, in the inverter housing at least three distinct zones are demarcated which include: a direct current (DC) chamber; a phase-control chamber; and an external communication chamber which all have varying levels of EMI. For instance, the magnitude of EMI in the DC chamber may be less than the magnitude of EMI in the phase-control chamber, and the magnitude of EMI in the external communication chamber may be less than the magnitude of EMI in the DC chamber. Thus, the noisy area (dirty area) is the phase-control chamber, an area with less noise (clean area) is the DC chamber, and a very clean area (very clean area) is the external communication chamber. Components contained in the phase-control chamber interact with switched power circuits and can function with a higher level of EMI than other components in the inverter. The DC chamber contains components with EMI noise sensitivity such as the DC bus assembly, an EMI filter, and/or an interface with a capacitor. The external communication chamber contains components that operate with a relatively low voltage and send/receive communication signals from components external to the inverter. Designing the inverter in this manner allows the chance of undesirable operation caused by EMI to be reduced and also enables the size of the inverter to be decreased while achieving EMI targets, if desired.

Figure 1:
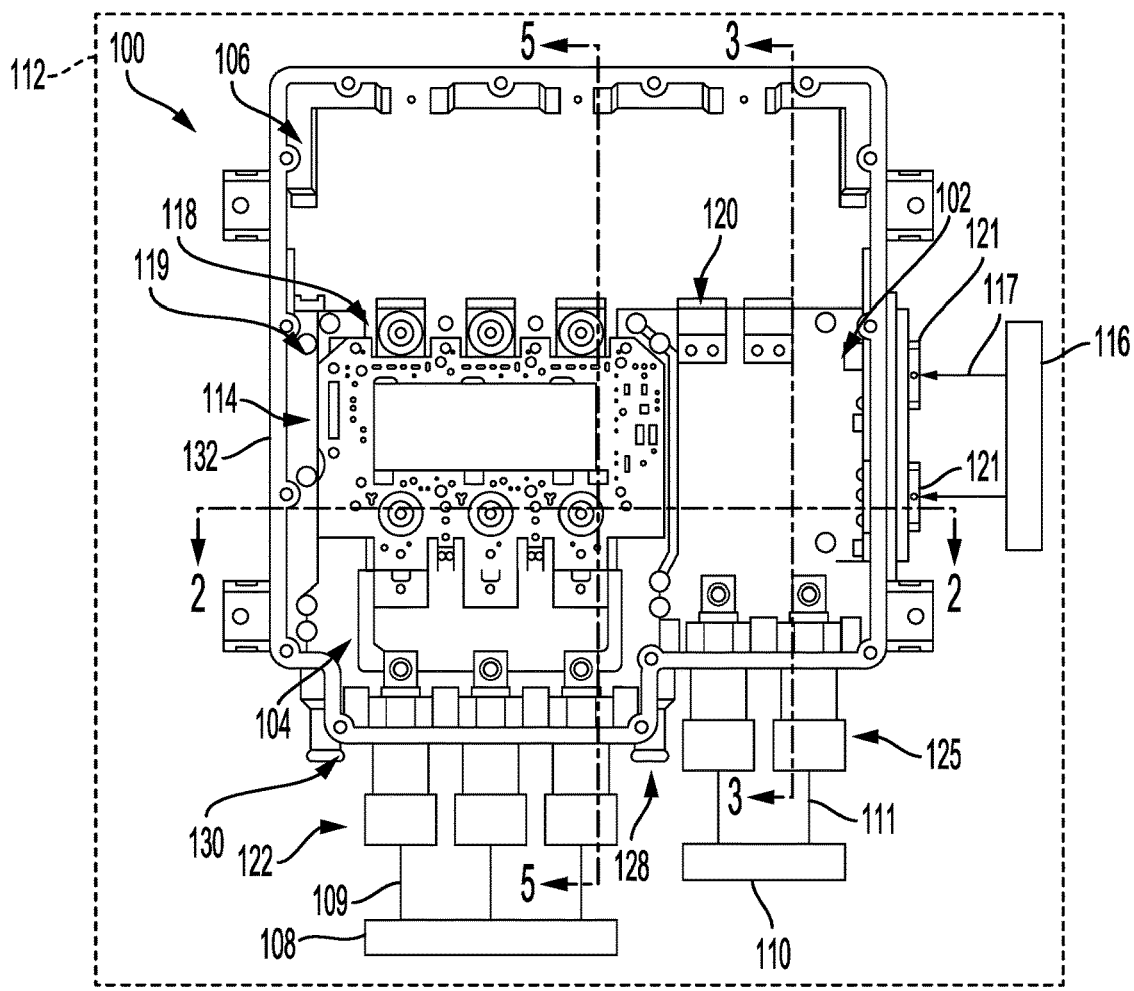
FIG. 1 is an illustration of an inverter and an exemplary operating environment in which it may be utilized.

FIG. 1 depicts an inverter 100 that is designed to convert DC to alternating current (AC). To achieve this functionality, the inverter 100 includes a DC bus bar assembly 102 and an AC bus bar assembly 104 which are both electrically connected to a capacitor 106 either directly or indirectly. To form the internal electrical connections in the inverter described herein conductive plates, harnesses, capacitors, cables, combinations thereof, and the like may be used to establish these connections. Similarly, cables, harnesses, combinations thereof, and/or other suitable components for establishing electrical connections may be used to electrically couple the inverter to external components. However, cables, under some operating conditions, function as antennas which pick up electromagnetic interference (EMI) noise. Therefore, use of extraneous cables within the inverter may be avoided to diminish internal EMI.

The inverter 100 may be coupled to an AC electrical component 108 and a DC electrical component 110 (e.g., a vehicle energy storage system, in an electric vehicle (EV) embodiment). Cables 109 and 111 and/or other suitable electrically conductive components are used to electrically couple the AC electrical component 108 and the DC electrical component 110 to the inverter 100. In one example, the inverter 100 may be included in an EV 112 or other suitable electric system, and may be referred to as a power electronics unit, in the EV example. In such an example, the inverter adjusts the speed of a traction motor in the vehicle. The EV 112 may be a light, medium, or heavy duty vehicle. In such an example, the AC electrical component 108 may be a traction motor and the DC electrical component 110 may be a traction battery. However, it will be understood that the inverter may be included in a variety of environments. For example, the inverter 100 may be included in a solar power installation, an industrial machine, and the like.

Further, the inverter 100 may include a gate-driver circuit board (e.g., a gate-driver printed circuit board assembly (PCBA)) 114 that is designed to control the power distributed by the inverter 100. For instance, in the EV example, the gate-driver circuit board 114 adjusts the amount of power supplied to the traction motor to alter the motor's speed. However, as indicated above the inverter may be used in a variety of operating environments. The gate-driver circuit board 114 and the other circuit boards described herein may include one more microprocessors, memory, and the like to achieve the power adjustment functionality. A control circuit board (e.g., control PCBA) 310, shown in FIG. 3, may receive electrical energy and receive signals from and send signals to a lower voltage component 116 as indicated via arrows 117. To elaborate, electrical connectors 121 that form an external communication interface serve as the connection between the lower voltage component 116 and a flexible circuit board 1300, shown in FIGS. 13 and 14, which is electrically connected to the control circuit board 310. The lower voltage component may include a lower voltage power supply and/or a controller. As such, this electrical energy may have a lower voltage than the electrical energy flowing into and out of the inverter via the connectors 122 and 125.

As illustrated in FIG. 1, the capacitor 106 is electrically coupled to a power module 119 (e.g., a power transistor module) via an electrical interface 118 (e.g., DC bus bar interface). The electrical interface 120 between the DC bus bar assembly 102 and the capacitor 106 is further depicted. Further, electrical connectors 122 that facilitates efficient electrical coupling between phase bus bars in the AC bus bar assembly 104 and the AC electrical component 108 is additionally illustrated in FIG. 1. DC input connectors 125 that facilitate efficient electrical coupling between DC bus bars in the DC bus bar assembly 102 and the DC electrical component 110 (e.g., the vehicle's energy storage system, as indicated above) are further illustrated in FIG. 1.

In the illustrated example, a coolant inlet 128 and a coolant outlet 130 are further included in the inverter 100. A housing 132 may include coolant conduits through which the coolant circulates and removes heat from the inverter 100. Suitable cooling system components may be hydraulically coupled to the coolant inlet and outlet such as one or more pumps, a heat exchanger, a filter, and the like. The coolant may include water, glycol, combinations thereof, and the like.

An axis system 199 is provided in FIG. 1 as well as FIGS. 2-14, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Cutting planes 2-2, 3-3, and 5-5 indicating the locations of the cross-sectional views depicted in FIGS. 2, 3, and 5 are provided for reference in FIG. 1.

Figure 2:
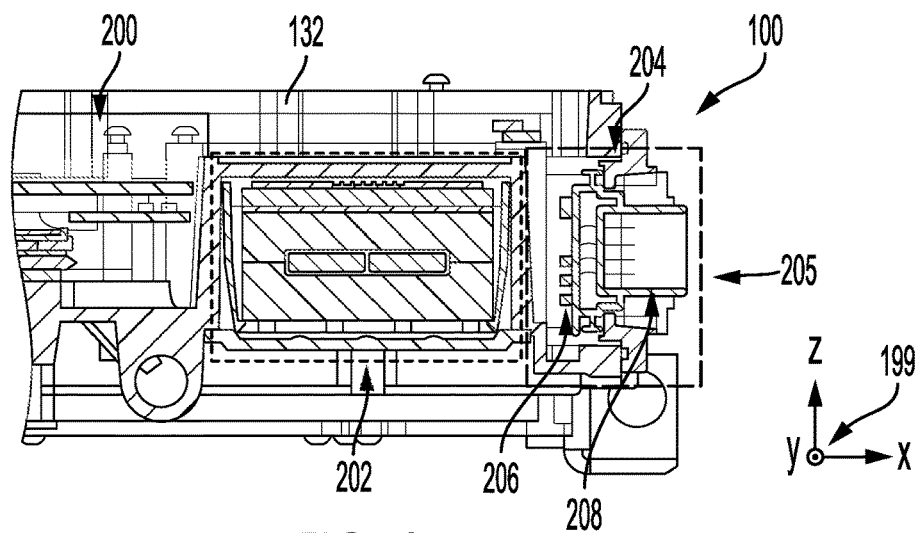
FIG. 2 is a cross-sectional view of the inverter, depicted in FIG. 1, with the cross-section extending through multiple chambers in the housing.
Figure 3:
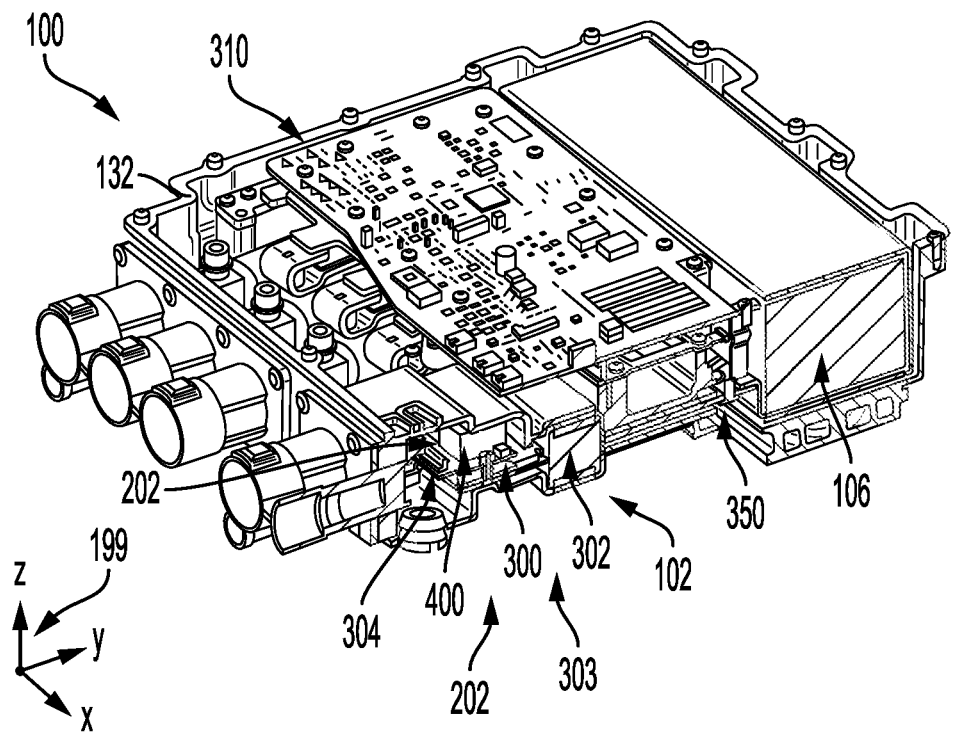
FIG. 3 is a cross-sectional view of the inverter, depicted in FIG. 1, with the cross-section extending through a direct current (DC) assembly.

FIG. 2 shows a cross-sectional view of the inverter 100. The inverter 100 in the illustrated example, include multiple chambers within the housing 132. These chambers include a phase-control chamber 200, a DC chamber 202 (e.g., DC separated chamber), and/or an external communication chamber 204. Partitioning the housing into these chambers enables EMI to be reduced thereby increasing inverter compliance to electromagnetic emissions targets. The phase-control chamber 200 contains (e.g., fully encloses) the gate-driver circuit board 114, the AC bus bar assembly 104 depicted in FIG. 1, and partially encloses a control circuit board 310, shown in FIG. 3.

Further, the DC chamber 202 contains the DC bus bar assembly 102 depicted in FIG. 1, and the external communication chamber 204 may contain LV communication components (e.g., a communication circuit board 206, connectors 208, and the like) designed to interface with components external to the inverter. The phase-control chamber 200 may have greater noise than the DC chamber. Additionally, the external communication chamber may have less noise than the DC chamber. In this way, the external communication chamber is designed to protect the LV signals from the noise present in the phase-control chamber.

The DC chamber 202 is positioned laterally between the phase-control chamber 200 and the external communication chamber 204 (e.g., lower voltage (LV) chamber) and the external communication chamber 204 is positioned on a lateral side 205 of the inverter 100. Partitioning the housing into these chambers enables EMI to be reduced thereby increasing inverter 100 performance. The phase-control chamber 200 contains (e.g., at least partially encloses) the gate-driver circuit board 114 and the AC bus bar assembly 104 depicted in FIG. 1, the DC chamber 202 contains the DC bus bar assembly 102 depicted in FIG. 1, and the external communication chamber 204 may contain external communication components (e.g., a communication circuit board 206, connectors 208, and the like) designed to interface with components external to the inverter. The phase-control chamber 200 may have a greater amount of EMI than the DC chamber 202. Additionally, the external communication chamber 204 may have less EMI than the DC chamber 202.

FIG. 3 shows a cross-sectional view of the inverter 100 with internal features of the DC bus bar assembly 102 revealed. The AC bus bar assembly 104 and the capacitor 106 are again depicted. The control circuit board 310 is further illustrated in FIG. 3. The control circuit board 310 is designed to alter an amount of electric power distributed from the power electronics unit to the external AC electrical component 108 (e.g., the traction motor).

The DC bus bar assembly 102 includes an entry cavity 300 and a ferrite filter 302. The entry cavity 300 may contain an EMI PCB assembly 303. In the illustrated example, the EMI PCB assembly 303 includes EMI filtering capacitors 400, a current sensor 402 shown in FIG. 3, and an electrical connector 304 that is designed to electrically connect to the gate-driver circuit board 114, shown in FIG. 1. The DC bus bar assembly 102 is positioned in the DC chamber 202 of the housing 132, as previously discussed. However, in alternate examples, the DC chamber and the external communication chamber may form a single chamber.

As previously indicated, the DC chamber 202 is separated (e.g., isolated) from the other chambers and provide a cleaner zone (with regard to EMI) which contains EMI noise sensitive components such as the DC bus bar assembly 102, the EMI filtering capacitors 400 (described in greater detail herein), and an electrical interface 350 with the capacitor 106.

Figure 4:
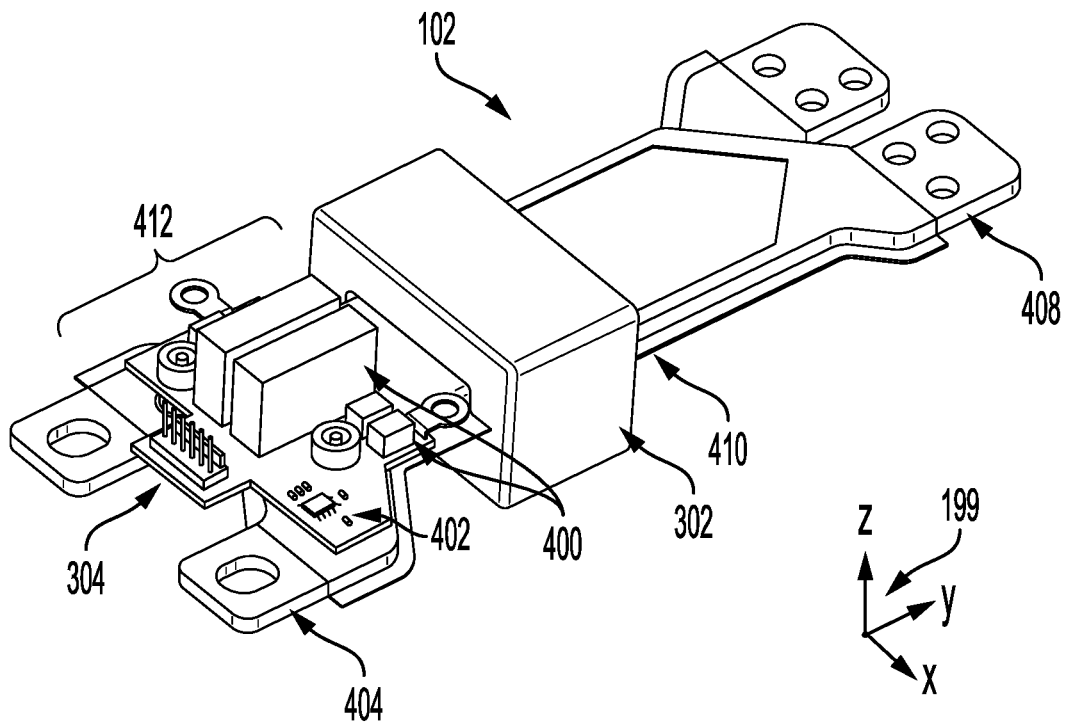
FIG. 4 is a detailed perspective view of the DC bus bar assembly in the inverter, depicted in FIG. 1.
Figure 5:
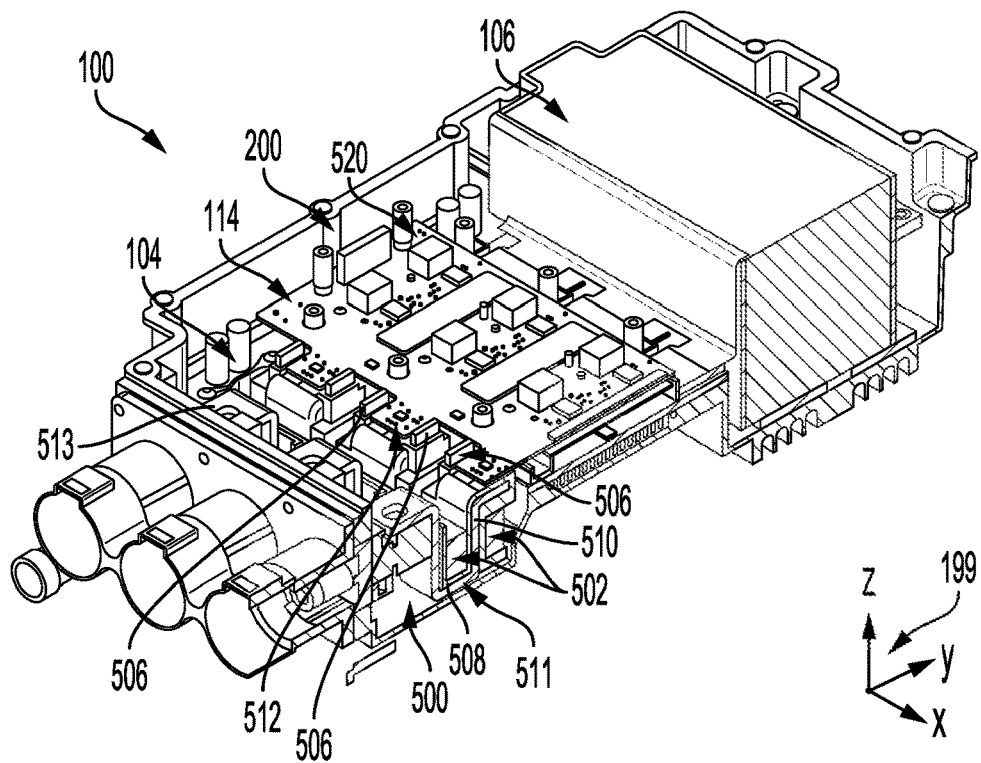
FIG. 5 is a cross-sectional view of the inverter, depicted in FIG. 1, with the cross-section extending through an alternating current (AC) bus bar assembly.

FIG. 4 shows a detailed view of the DC bus bar assembly 102 with DC bus bars 404 which include holes or other suitable features that enable the DC bus bars to function as an electrical input interface (e.g., bolted electrical input interface) to the DC input connectors 125, shown in FIG. 1. The DC bus bar assembly 102 further includes an electrical output interface 408 (e.g., bolted electrical output interface) that is coupled to the capacitor 106, shown in FIG. 1, when assembled. The electrical output interface 408 includes tabs with openings to enable a robust electrical connection to be established. The DC bus bars 404 and the other bus bars described herein may be constructed out of a suitable conductive material such as copper, aluminum, brass, combinations thereof, and the like.

In the illustrated example, the ferrite filter 302 is included in the DC bus bar assembly 102. The ferrite filter 302 is designed to reduce EMI noise exiting the inverter, towards the DC electrical component 110, shown in FIG. 1. Consequently, the inverter may be placed closer to the DC electrical component, if desired. Specifically, in the illustrated example, the ferrite filter 302 extends around a body of the assembly at a mid-portion 410 thereof. However, in other examples, the ferrite filter may have a different contour (e.g., positioned on an upper or lower side of the body of the bus bar assembly) and/or may be placed in a different location along the bus bar assembly. Still further in other examples, the ferrite filter 302 may be omitted from the DC bus bar assembly. The ferrite filter 302 may specifically be a common-mode filter which selectively removes noise in a targeted frequency range while allowing signals in another frequency to pass, in one example. In this way, the DC bus bar assembly may precisely filter out undesirable noise.

The DC bus bar assembly 102 further includes an EMI filtering and current sensing circuit board 412. In the illustrated example, the EMI filtering and current sensing circuit board 412 includes the EMI filtering capacitors 400, the current sensor 402 (e.g., hall effect sensor), and the connector 304 (e.g., the signal harness). The current sensor 402 reads the DC current flowing through the DC bus bars 404. The connector 304 sends signals to the control circuit board 310, shown in FIG. 3. Wires may be used to send the signals between the connector 304 and the control circuit board 310. The EMI filtering capacitors 400 decrease the amount of EMI noise coming out of the inverter towards the external DC electrical component 110 (towards the vehicle high-voltage power distribution system).

The EMI filtering and current sensing circuit board 412 with the sensing and filtering components may be positioned between the DC bus bars 404 and the ferrite filter 302, in relation to the y-axis. In this way, the circuitry on the board may be protected from EMI, thereby increasing inverter performance in comparison to inverters without the EMI filtering features described herein.

Further, positioning the EMI filtering and current sensing circuit board 412 near the DC input connectors 125, shown in FIG. 1, allows the current sensor to have closer proximity to the DC bus bars 404 than other locations such as near the rear of the DC bus bar assembly 102. In this way, the current sensor reading may be simplified which enables the signal to be processed using less processing resources, if wanted.

It will also be appreciated that a field concentrator may be omitted from the inverter due to the placement of the EMI filtering and current sensing circuit board 412 near the input connectors 125, shown in FIG. 1, (e.g., near the front of the DC bus bar assembly 102), if wanted. When the field concentrator is omitted, the DC current sensor signal may be filtered and compensated to remove the AC components from the signal. The DC current signal processing may contain one or more of the following processing strategies: offset calibration; gain calibration; low-pass filtering; and external field cancellation (e.g., the removal of influence from nearby conductors such as the phase bus bars).

FIG. 5 shows a cross-sectional view of the AC bus bar assembly 104 and the capacitor 106 in the inverter 100 along with the gate-driver circuit board 114. In the illustrated example, the AC bus bar assembly 104 includes phase bus bars 500, a ferrite filter 502, and current sensor shields 506 which are all incorporated into a plastic molding 508. The plastic molding 508 functions to retain these components in a single structure for simplified installation. The plastic molding 508 further enables a section 510 of the phase bus bars 500 to be arranged between ferrite filter 502 to reduce the amount of undesirable EMI noise which exits the inverter toward the external AC electrical component 108, shown in FIG. 1. The phase bus bars 500 further includes a section 511 that extends under (with regard to the z-axis) the plastic molding 508. Section 511 provide a thermal interface to the cooling surface under the phase bus bars 500. Further, the phase bus bars 500 are connected to AC outlet connectors 513.

The current sensor shields 506 are positioned around the AC current sensors 512 on the gate-driver circuit board 114. In this way, phase-to-phase interference, also referred to as cross-talk, in the inverter is reduced.

In the phase-control chamber 200, components that are close to the switched power circuits are separated (e.g., isolated) from the other chambers. These components may include the gate-driver circuit board 114 with semiconductors and semiconductor drivers 520, the capacitor 106 (e.g., DC link capacitor), and the AC current sensors 512.

Figure 6:
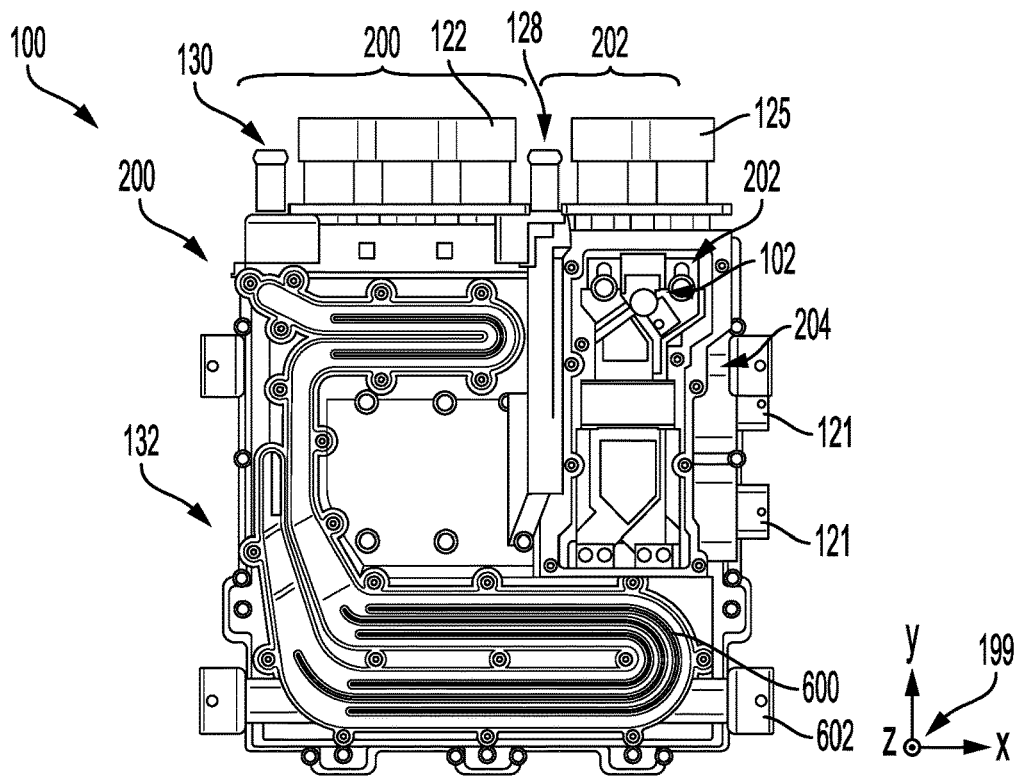
FIG. 6 is a bottom view of the inverter, depicted in FIG. 1.

FIG. 6 shows a bottom view of the inverter 100. The electrical connectors 122 and the DC input connectors 125 are again illustrated along with the housing 132, and the DC bus bar assembly 102 in the DC chamber 202. Additionally, the coolant inlet 128 and the coolant outlet 130 are depicted along with coolant conduits 600 that traverse the housing 132. Specifically, the coolant conduits traverse a section of the housing 132 which holds the capacitor and a section of the housing near the phase bus bars. In this way, the inverter 100 is effectively cooled.

Figure 13:
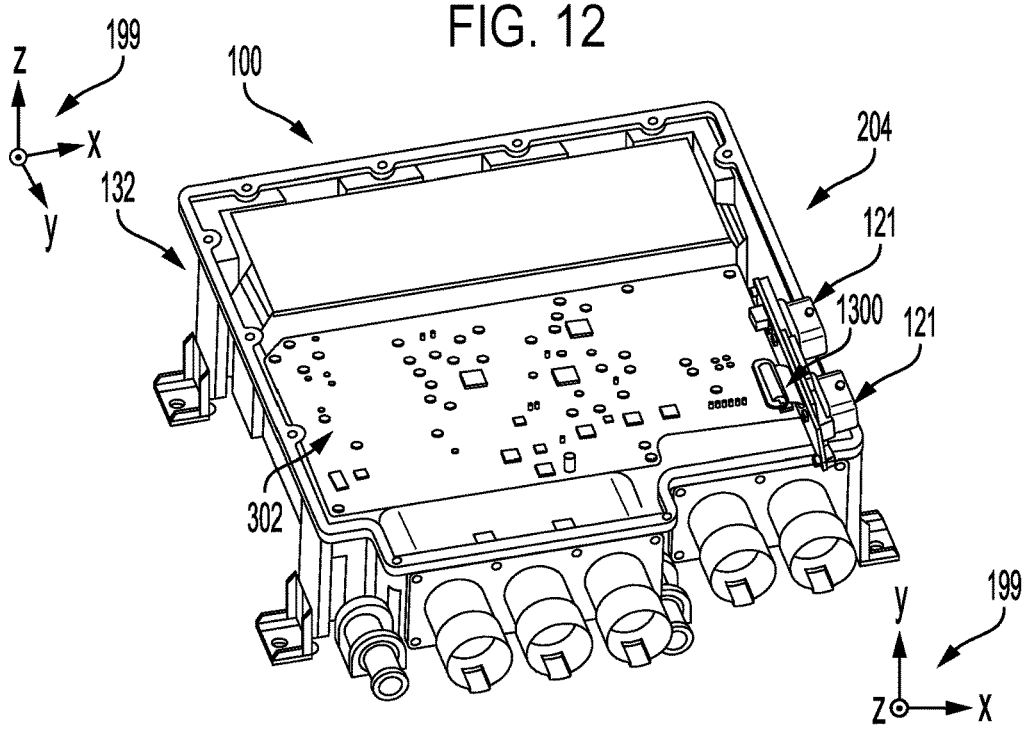
FIGS. 13-14 are different views of electrical connectors for a flexible circuit board in the inverter, depicted in FIG. 1.
Figure 14:
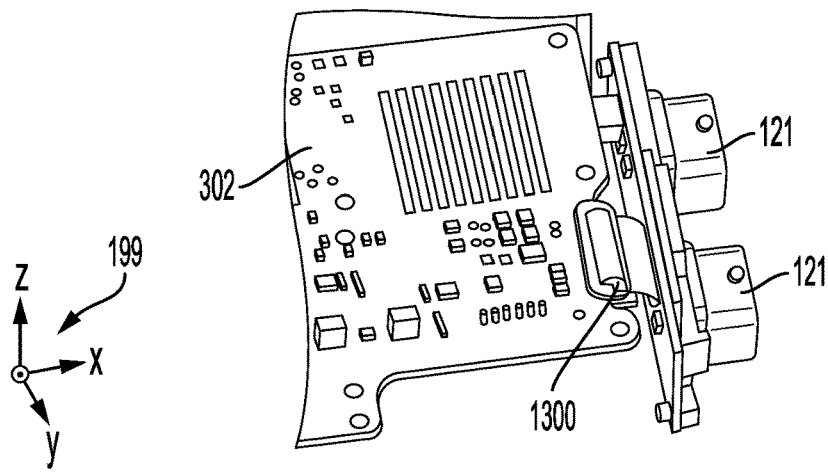

Electrical connectors 121 that serve as an electrical connection between the lower voltage component 116, shown in FIG. 1, and the flexible circuit board 1300, shown in FIGS. 13 and 14, which is electrically coupled to the control circuit board 310, shown in FIG. 3.

The phase-control chamber 200, the DC chamber 202, and the external communication chamber 204 are further shown in FIG. 6. Specifically, the general lateral boundaries of the phase-control chamber 200 and the DC chamber 202 along the x-axis are indicated. However, it will be appreciated that the boundaries of these chambers have greater complexity that is expanded upon herein. Mounts 602 in the housing 132 which allow the inverter to be connected to desired components are further depicted in FIG. 6.

The external communication chamber 204 functions as a zone that is even cleaner (with regard to EMI) than the DC chamber 202 and may contain components for external communication which send signals to interface with the outside world of the inverter. These components are discussed in greater detail herein with regard to FIGS. 13-14.

Figure 7:
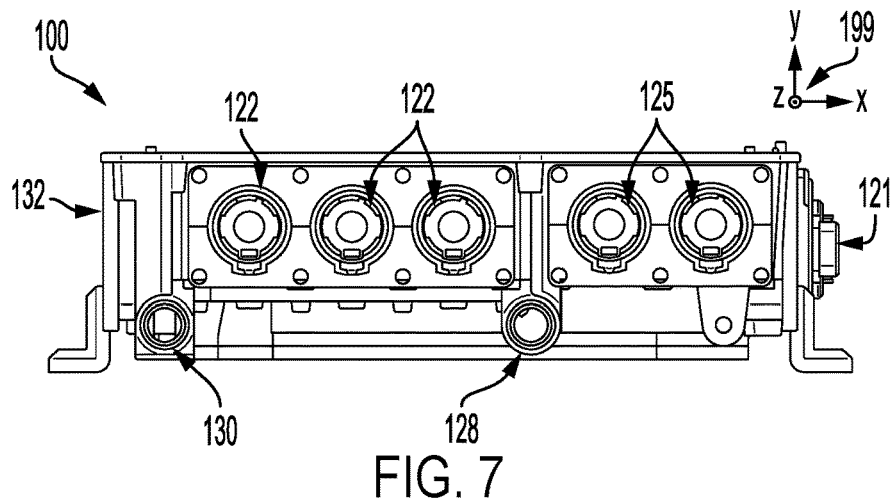
FIG. 7 is a front view of the inverter, depicted in FIG. 1.

FIG. 7 shows the inverter 100 with the electrical connectors 122, the DC input connectors 125, the coolant inlet 128, the coolant outlet 130, the housing 132, and the electrical connectors 121.

Figure 8:
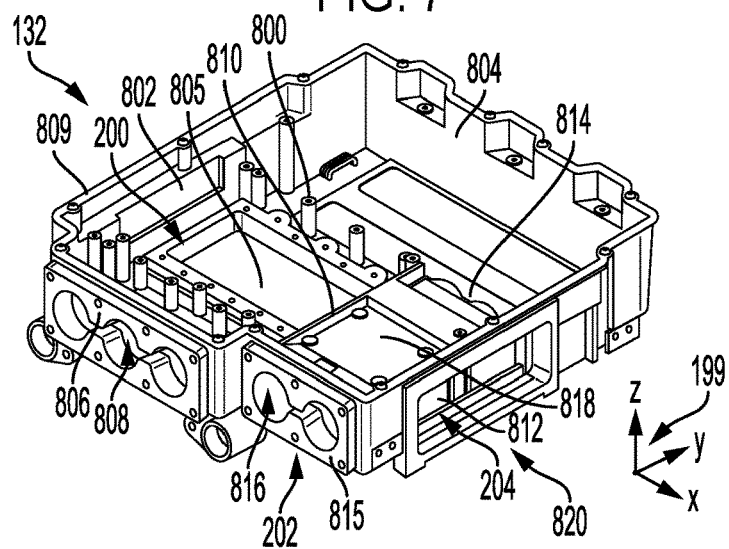
FIGS. 8-9 are perspective views of the housing of the inverter, depicted in FIG. 1.

FIG. 8 shows a perspective view of the housing 132 with the phase-control chamber 200, the DC chamber 202, and the external communication chamber 204. In the illustrated configuration, the DC chamber 204 is formed via an opening underneath the inverter which creates a separate area from the phase-control chamber 200 during manufacturing of the housing which may occur via a suitable technique such as casting.

In the casting example, a drawer casting process may be employed to create the different housing chambers. Physical drawers may be used to obtain the profile of the different chambers and then the drawers can be demolded during the casting process. To elaborate, a first drawer may be placed in the mode to create the phase-control chamber, a second drawer may subsequently be placed in the bottom of the mold to create the DC chamber, and then a third drawer may be placed in the side of the mold to create the external communication chamber 204. In this way, the different housing zones may be kept distinct from one another. However, the boundaries and/or manufacturing technique for the chambers may differ in other embodiments.

In the phase-control chamber 200, mounting extensions 800 may be provided to facilitate mounting of the circuit boards and other electronics within the chamber. A housing sidewall 802, a rear wall 804, a bottom wall 805, and a front wall 806 with opening 808 for the electrical connectors 122, shown in FIG. 1 may form at least a portion of the boundary of the phase-control chamber 200. Further, a top wall (e.g., plate) may be coupled to a housing flange 809 to form another boundary of the phase-control chamber 200. In this way, the phase-control chamber is able to compactly enclose the AC bus bar assembly, capacitor, and associated components. The phase-control chamber may have a different profile in alternate embodiments.

The DC chambers 202, in the illustrated example, is bounded by an inner sidewall 810, an outer sidewall 812, a back wall 814, a front wall 815 with openings 816 for the DC input connectors 125 shown in FIG. 1, and a top wall 818. In this way, the components in the chamber may be effectively contained. However, the DC chamber may have a different profile in alternate embodiments.

The external communication chamber 204, in the illustrated example, is bounded by the outer sidewall 812 and is positioned on a lateral side 820 of the housing 132. In this way, components such as the connectors 121, shown in FIG. 1, may be quickly and efficiently connected to external components as well as effectively shielded from the EMI generated in the other chambers.

Figure 9:
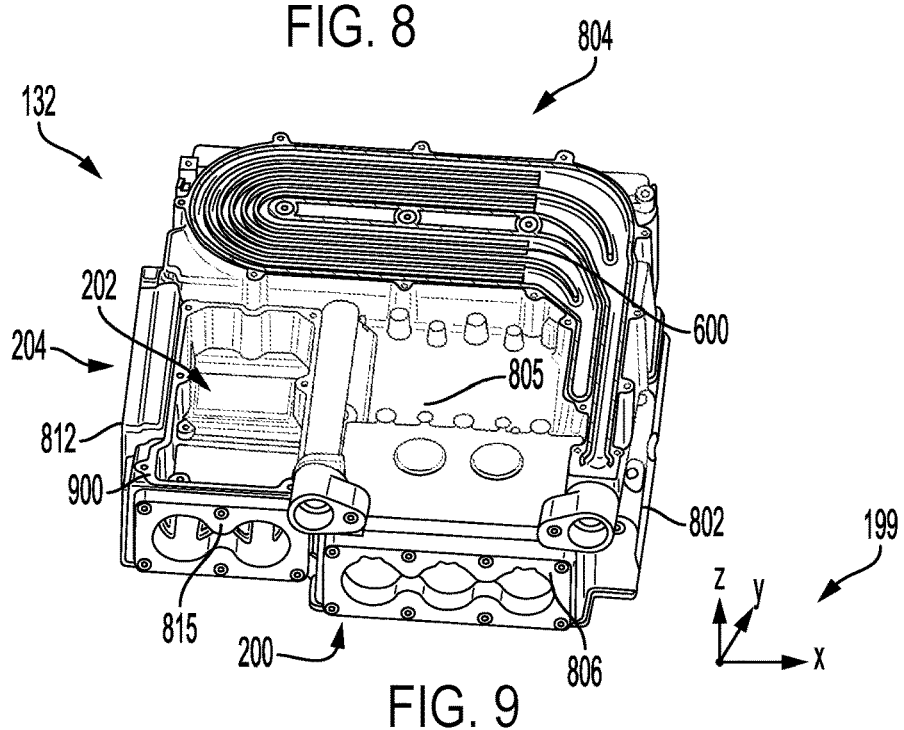

FIG. 9 shows a bottom perspective view of the housing 132 with the phase-control chamber 200, the DC chamber 202, and the external communication chamber 204. The front walls 806 and 815, the outer sidewall 812, the sidewall 802, the rear wall 804, and the bottom wall 805 are again illustrated along with the coolant conduits 600 that traverse the housing. As previously discussed, during the manufacturing of the housing 132, a drawer may be placed in the DC chamber 202 location and then demolded during the casting process to form the walls which bound the chamber. The DC chamber 202 may further include a flange 900 that serves as an attachment for a bottom wall.

Figure 10:
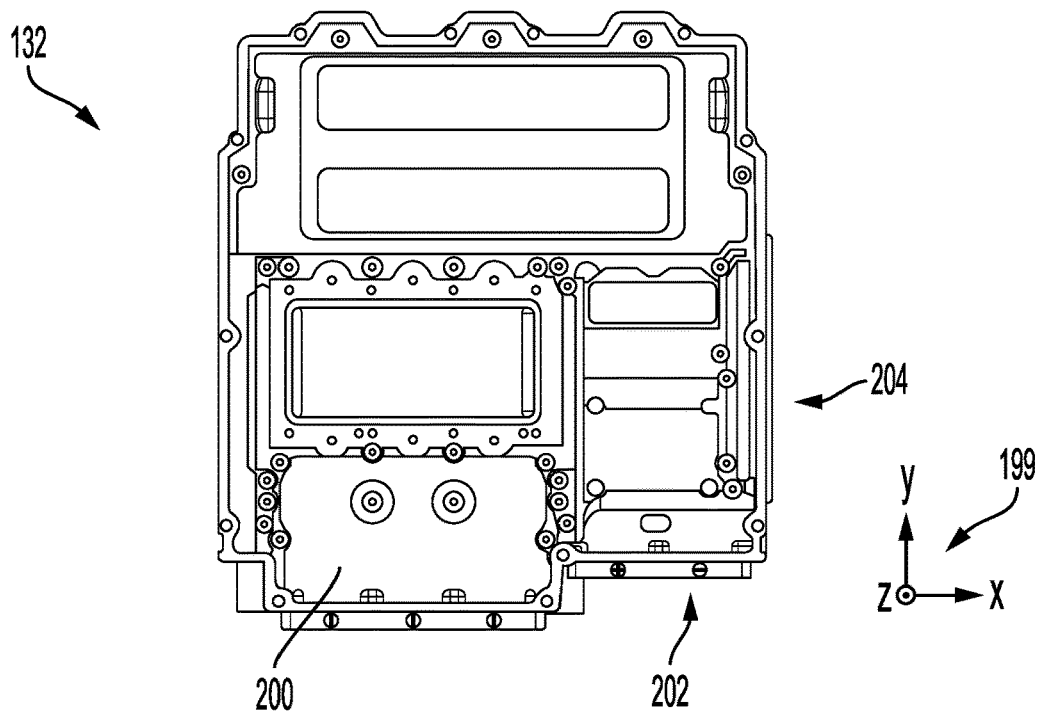
FIG. 10 is a top view of the housing of the inverter, depicted in FIG. 1.

FIG. 10 shows a bottom view of the housing 132 with the phase-control chamber 200, the DC chamber 202, and the external communication chamber 204. The phase-control chamber 200

Figure 11:
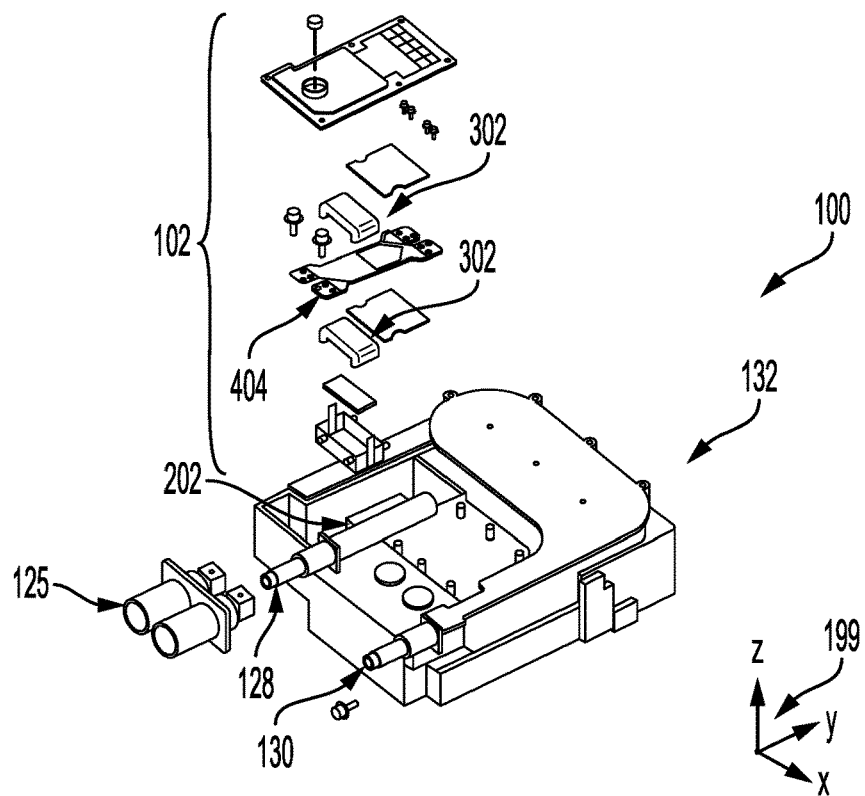
FIG. 11 is an exploded view of the DC bus bar assembly in the inverter, depicted in FIG. 1.

FIG. 11 shows the inverter 100 with the housing 132 and the DC bus bar assembly 102 in an exploded view. The DC bus bar assembly 102 include the DC bus bars 404 formed on a conductive plate and the ferrite filter 302 which may at least partially surround the conductive plate and reduced the amount of EMI noise that exits the DC chamber. In this way, the likelihood of the inverter undesirably electromagnetically interfering with surrounding components is decreased. The DC input connectors 125 and the coolant inlet 128 and the coolant outlet 130 are again shown in FIG. 11.

Figure 12:
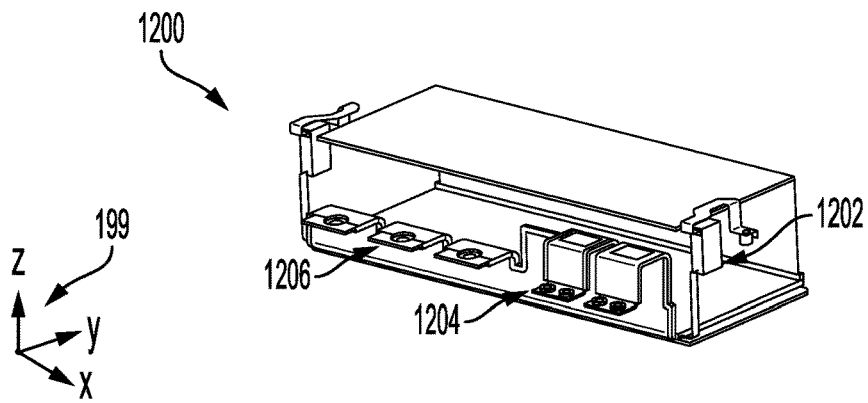
FIG. 12 is a perspective view of a y-capacitor in a decoupling link.

FIG. 12 shows an example of a decoupling link 1200 with y-capacitors 1202 that function to filter EMI. The decoupling link 1200 may be designed to selectively decouple the DC bus bar assembly from the capacitor. The decoupling link 1200 includes electrical interfaces 1204 that may be coupled to the DC bus bar assembly. The link 1200 further includes electrical interfaces 1206 that may be coupled to components in the phase-control chamber such as the gate driver circuit board, in one example. The y-capacitor 1202 may be used as an alternative to the EMI filtering capacitors 400, shown in FIG. 4, in one example.

FIGS. 13 and 14 show the external communication chamber 204 in the inverter 100 with the electrical connectors 121 electrically connected to a flexible circuit board 1300 which is directly coupled to the control circuit board 310. Further, the control circuit board 310 is depicted laterally spanning the housing 132 which increased the space efficiency of the inverter. Using the flexible circuit board allows the number of cables in the inverter to be reduced thereby reducing EMI generated by the inverter and transmitted to the surrounding environment.

FIGS. 1-14 are drawn approximately to scale, aside from the components which are schematically represented in FIG. 1. Although other relative component dimensions may be used, in other embodiments.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an inverter is provided that comprises a direct current (DC) bus bar assembly electrically coupled to a capacitor and positioned within a DC chamber in the housing; a gate-driver circuit board included in a phase-control chamber in the housing; and an external communication interface in electronic communication with the power control circuit board and positioned in an external communication chamber in the housing; wherein the DC chamber, the phase-control chamber, and the external communication chamber have varying levels of electromagnetic interference (EMI).

In another aspect, an inverter in an electric drive unit is provided that comprises a direct current (DC) bus bar assembly with an electromagnetic interference (EMI) filtering and DC current sensing circuit board assembly coupled to the DC bus bar and positioned within a DC chamber in the housing; and a gate-driver circuit board included in a phase-control chamber in the housing; wherein a magnitude of the EMI in the DC chamber is less than a magnitude of the EMI in the phase-control chamber.

In any of the aspects or combinations of the aspects, a magnitude of EMI in the DC chamber may be less than a magnitude of EMI in the phase-control chamber.

In any of the aspects or combinations of the aspects, a magnitude of EMI in the external communication chamber may be less that the magnitude of the EMI in the DC chamber.

In any of the aspects or combinations of the aspects, the DC chamber may be positioned laterally between the phase-control chamber and the external communication chamber.

In any of the aspects or combinations of the aspects, the external communication chamber may be positioned on a lateral side of the inverter.

In any of the aspects or combinations of the aspects, the inverter may further comprise a plurality of semiconductors, a plurality of semiconductor drivers, a capacitor, and/or a plurality of alternative current (AC) current sensors positioned in the phase-control chamber.

In any of the aspects or combinations of the aspects, the DC bus bar assembly may include an EMI filtering and DC current sensing circuit board assembly positioned within the DC chamber.

In any of the aspects or combinations of the aspects, the EMI filtering and DC current sensing circuit board may include a ferrite filter.

In any of the aspects or combinations of the aspects, the inverter may further comprise an electrical interface positioned in the external communication chamber and electrically coupled to the control circuit board via a flexible circuit board.

In any of the aspects or combinations of the aspects, the DC bus bar assembly may include a plurality of connectors designed to electrically couple to an energy storage device.

In any of the aspects or combinations of the aspects, the energy storage device is a traction battery.

In any of the aspects or combinations of the aspects, the inverter may further comprise an external communication interface in electronic communication with a control circuit board and positioned in an external communication chamber in the housing, wherein the control circuit board is at least partially enclosed within the external communication chamber.

In any of the aspects or combinations of the aspects, a magnitude of the EMI in the external communication chamber may be less than the magnitude of the EMI in the DC chamber.

In any of the aspects or combinations of the aspects, the DC chamber may interpose the phase-control chamber and the external communication chamber.

In any of the aspects or combinations of the aspects, the inverter may further comprise a flexible circuit board positioned in the external communication chamber and designed to send and receive communication data from an external source to the control circuit board.

In any of the aspects or combinations of the aspects, the inverter may further comprise a first ferrite filter positioned in the DC chamber and a second ferrite filter positioned in the phase-control chamber.

In any of the aspects or combinations of the aspects, the inverter may further comprise a capacitor electrically coupled to the DC bus bar assembly and positioned on a rear side of the inverter, wherein the DC bus bar assembly is electrically coupled to a DC electrical interface positioned at a front side of the inverter.

In any of the aspects or combinations of the aspects, the EMI filtering and DC current sensing circuit board assembly may be positioned adjacent to a DC electrical interface.

In any of the aspects or combinations of the aspects, the DC electrical interface may be designed to electrically connect to a traction battery and the AC electrical interface is designed to electrically connect to a traction motor.

In another representation, an inverter system is provided that comprises a direct current (DC) chamber which is bounded by walls on a lateral side of a housing, a lower voltage chamber positioned on a first lateral side of the DC chamber, and phase chamber positioned on a second lateral side of the DC chamber, wherein the chambers include circuit boards with varying levels of electromagnetic noise.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to a variety of electric systems. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An inverter comprising:
a direct current (DC) bus bar assembly positioned within a DC chamber in a housing;
a gate-driver circuit board and a plurality of phase bus bars positioned in a phase-control chamber in the housing; and
an external communication interface in electronic communication with a control circuit board and positioned in an external communication chamber in the housing, wherein the control circuit board is at least partially positioned in the phase-control chamber;
wherein the DC chamber, the phase-control chamber, and the external communication chamber have varying levels of electromagnetic interference (EMI).

2. The inverter of claim 1, wherein a magnitude of EMI in the DC chamber is less than a magnitude of EMI in the phase-control chamber.

3. The inverter of claim 2, wherein a magnitude of EMI in the external communication chamber is less that the magnitude of the EMI in the DC chamber.

4. The inverter of claim 1, wherein the DC chamber is positioned laterally between the phase-control chamber and the external communication chamber.

5. The inverter of claim 4, wherein the external communication chamber is positioned on a lateral side of the inverter.

6. The inverter of claim 1, further comprising a plurality of semiconductors, a plurality of semiconductor drivers, a capacitor, and/or a plurality of alternative current (AC) current sensors positioned in the phase-control chamber.

7. The inverter of claim 1, wherein the DC bus bar assembly includes an EMI filtering and DC current sensing circuit board assembly positioned within the DC chamber.

8. The inverter of claim 1, wherein the EMI filtering and DC current sensing circuit board includes a ferrite filter.

9. The inverter of claim 1, further comprising an electrical interface positioned in the external communication chamber and electrically coupled to the control circuit board via a flexible circuit board.

10. The inverter of claim 1, wherein the DC bus bar assembly includes a plurality of connectors designed to electrically couple to an energy storage device.

11. The inverter of claim 10, wherein the energy storage device is a traction battery.

12. An inverter in an electric drive unit, comprising:
a direct current (DC) bus bar assembly with an electromagnetic interference (EMI) filtering and DC current sensing circuit board assembly coupled to a plurality of DC bus bars and positioned within a DC chamber in a housing; and
a gate-driver circuit board and a plurality of phase bus bars positioned in a phase-control chamber in the housing;
wherein a magnitude of the EMI in the DC chamber is less than a magnitude of the EMI in the phase-control chamber.

13. The inverter of claim 12, further comprising an external communication interface in electronic communication with a control circuit board and positioned in an external communication chamber in the housing, wherein the control circuit board is at least partially enclosed within the external communication chamber.

14. The inverter of claim 13, wherein a magnitude of the EMI in the external communication chamber is less than the magnitude of the EMI in the DC chamber.

15. The inverter of claim 13, wherein the DC chamber interposes the phase-control chamber and the external communication chamber.

16. The inverter of claim 13, further comprising a flexible circuit board positioned in the external communication chamber and designed to send and receive communication data from an external source to the control circuit board.

17. The inverter of claim 12, further comprising a first ferrite filter positioned in the DC chamber and a second ferrite filter positioned in the phase-control chamber.

18. The inverter of claim 17, wherein the EMI filtering and DC current sensing circuit board assembly is positioned adjacent to a DC electrical interface.

19. The inverter of claim 12, further comprising a capacitor electrically coupled to the DC bus bar assembly and positioned on a rear side of the inverter, wherein the DC bus bar assembly is electrically coupled to a DC electrical interface positioned at a front side of the inverter.

20. The inverter of claim 19, wherein the DC electrical interface is designed to electrically connect to a traction battery and the AC electrical interface is designed to electrically connect to a traction motor.

* * * * *